United States Patent
Fahland et al.

(10) Patent No.: US 10,336,317 B2
(45) Date of Patent: Jul. 2, 2019

(54) METHOD FOR CONTROLLING VEHICLE LIFT

(71) Applicant: GM GLOBAL TECHNOLOGY OPERATIONS LLC, Detroit, MI (US)

(72) Inventors: Jason D. Fahland, Fenton, MI (US); Joshua R. Auden, Brighton, MI (US); David Dominguez, Tucson, AZ (US); Samantha J. Bray, South Bend, NE (US); Eric E. Krueger, Chelsea, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 15/215,463

(22) Filed: Jul. 20, 2016

(65) Prior Publication Data

US 2018/0022343 A1 Jan. 25, 2018

(51) Int. Cl.
| | |
|---|---|
| *B60W 10/04* | (2006.01) |
| *B60W 10/18* | (2012.01) |
| *B60W 10/30* | (2006.01) |
| *B60W 30/02* | (2012.01) |
| *B62D 37/02* | (2006.01) |

(52) U.S. Cl.
CPC ............ *B60W 30/02* (2013.01); *B60W 10/04* (2013.01); *B60W 10/18* (2013.01); *B60W 10/30* (2013.01); *B62D 37/02* (2013.01); *B60W 2300/18* (2013.01); *B60W 2300/28* (2013.01); *B60W 2510/22* (2013.01); *B60W 2520/105* (2013.01); *B60W 2520/16* (2013.01); *B60W 2530/20* (2013.01); *B60W 2710/18* (2013.01); *B60W 2710/30* (2013.01); *B60Y 2200/114* (2013.01); *B60Y 2300/02* (2013.01)

(58) Field of Classification Search
CPC ...... B60W 30/02; B60W 10/18; B60W 10/04; B60W 10/30; B60W 2520/16; B60W 2300/18; B60W 2710/30; B60W 2530/20; B60W 2520/105; B60W 2300/28; B60W 2710/18; B60W 2510/22; B62D 37/02; B60Y 2300/02; B60Y 2200/114
See application file for complete search history.

(56) References Cited

U.S. PATENT DOCUMENTS

| | | | | |
|---|---|---|---|---|
| 5,333,944 A * | 8/1994 | Shirai | ............... | B60T 8/4081 303/113.4 |
| 5,908,217 A * | 6/1999 | Englar | ............... | B62D 37/02 296/180.1 |
| 7,571,030 B2 * | 8/2009 | Ryu | ............... | B60T 8/172 340/440 |

(Continued)

*Primary Examiner* — Jeffrey C Boomer
(74) *Attorney, Agent, or Firm* — Lorenz & Kopf LLP

(57) ABSTRACT

Methods, systems, and vehicles are provided for controlling lift for vehicles. In accordance with one embodiment, a vehicle includes a body, one or more sensors, and a processor. The one or more sensors are configured to measure values pertaining to one or more parameter values for a vehicle during operation of the vehicle. The processor is coupled to the one or more sensors, and is configured to at least facilitate determining whether an unplanned lift of the body of the vehicle is likely using the parameters, and implementing one or more control measures when it is determined that the unplanned lift of the body of the vehicle is likely.

20 Claims, 2 Drawing Sheets

(56) References Cited

U.S. PATENT DOCUMENTS

| | | | | |
|---|---|---|---|---|
| 7,653,471 | B2* | 1/2010 | Mattson | B60G 17/0162 303/158 |
| 8,844,944 | B1* | 9/2014 | Murakami | B60G 17/016 280/5.514 |
| 9,381,957 | B1* | 7/2016 | Auden | B62D 35/007 |
| 9,889,845 | B2* | 2/2018 | Hieda | B60W 30/04 |
| 2002/0145333 | A1* | 10/2002 | Faye | B60T 8/17554 303/140 |
| 2004/0036320 | A1* | 2/2004 | Rees | B62D 35/007 296/180.1 |
| 2006/0261937 | A1* | 11/2006 | Lu | B60T 8/172 340/446 |
| 2007/0185623 | A1* | 8/2007 | Chen | B60W 30/04 701/1 |
| 2007/0192002 | A1* | 8/2007 | Iyoda | B60G 17/0164 701/37 |
| 2010/0090497 | A1* | 4/2010 | Beckon | B60Q 1/2661 296/180.5 |
| 2011/0288716 | A1* | 11/2011 | Marur | B60G 17/021 701/31.4 |
| 2015/0149046 | A1* | 5/2015 | Jeong | G01G 19/12 701/49 |
| 2015/0353149 | A1* | 12/2015 | Wolf | B62D 35/007 296/180.5 |
| 2016/0009275 | A1* | 1/2016 | Hieda | B60K 28/16 701/70 |
| 2016/0137196 | A1* | 5/2016 | Beever | B60W 50/0097 701/90 |
| 2016/0221613 | A1* | 8/2016 | Handzel, Jr. | B62D 35/00 |
| 2017/0038775 | A1* | 2/2017 | Park | B60W 50/00 |
| 2017/0080987 | A1* | 3/2017 | Morgan | B62D 37/02 |
| 2017/0240226 | A1* | 8/2017 | Brooks | B62D 35/007 |
| 2018/0111650 | A1* | 4/2018 | Swantick | B62D 35/005 |

* cited by examiner

METHOD FOR CONTROLLING VEHICLE LIFT

TECHNICAL FIELD

The present disclosure generally relates to vehicles, and more particularly relates to methods and systems for controlling vehicle lift.

BACKGROUND

Certain vehicles today, such as racecars and other performance vehicles, utilize downforce for potentially improving performance. For example, certain performance vehicles utilize airfoils, wings, or other devices to generate downforce for the vehicle. An increase in downforce can enhance lateral capability for the vehicle, for example when turning a corner. However, in certain environments (e.g. certain hills and valleys) can result in undesired vehicle lift instead of downforce under certain circumstances.

Accordingly, it is desirable to provide techniques for improved control of vehicle lift. It is also desirable to provide methods, systems, and vehicles incorporating such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises obtaining one or more parameter values for a vehicle during operation of the vehicle, determining whether an unplanned lift of the vehicle is likely using the parameters, and implementing one or more control measures when it is determined that the unplanned lift of the vehicle is likely.

In accordance with another exemplary embodiment, a system is provided. The system comprises one or more sensors and a processor. The one or more sensors are configured to measure values pertaining to one or more parameter values for a vehicle during operation of the vehicle. The processor is coupled to the one or more sensors, and is configured to at least facilitate determining whether an unplanned lift of the vehicle is likely using the parameters, and implementing one or more control measures when it is determined that the unplanned lift of the vehicle is likely.

In accordance with a further exemplary embodiment, a vehicle is provided. The vehicle comprises a body, one or more sensors, and a processor. The one or more sensors are configured to measure values pertaining to one or more parameter values for a vehicle during operation of the vehicle. The processor is coupled to the one or more sensors, and is configured to at least facilitate determining whether an unplanned lift of the body of the vehicle is likely using the parameters, and implementing one or more control measures when it is determined that the unplanned lift of the body of the vehicle is likely.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
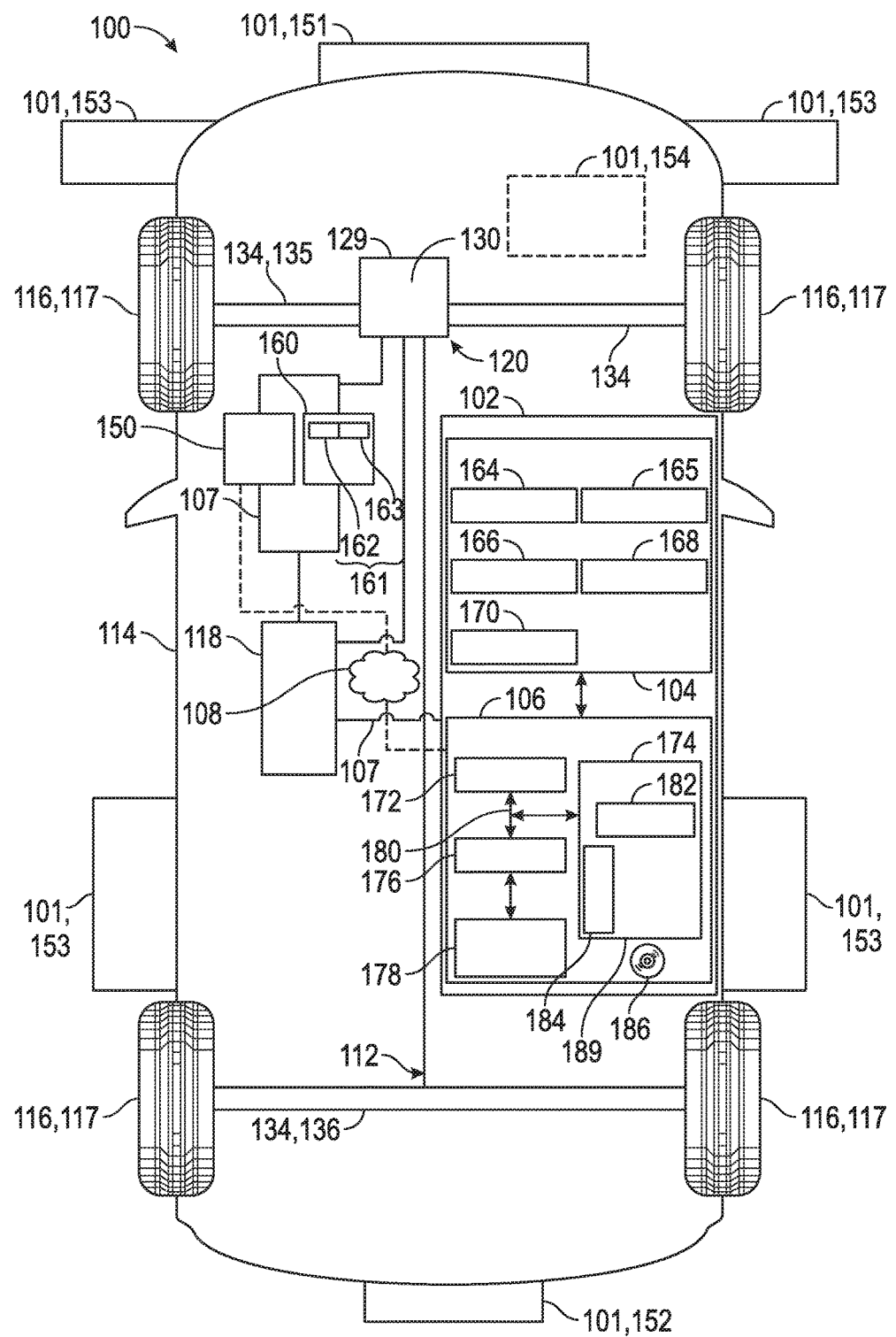
FIG. 1 is a functional block diagram of a vehicle, and that includes a control system for controlling lift for the vehicle, in accordance with an exemplary embodiment.

FIG. 1 illustrates a vehicle 100, according to an exemplary embodiment. As described in greater detail below, the vehicle 100 includes a body 114 and a control system 102 for controlling lift for the vehicle 100. In various embodiments the vehicle 100 comprises an automobile; however, this may vary in other embodiments. Also in certain embodiments the vehicle 100 comprises a performance vehicle, such as a racecar or other vehicle capability of relatively high performance and speed. The vehicle 100 may be any one of a number of different types of automobiles and/or other vehicles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

In one embodiment depicted in FIG. 1, the vehicle 100 includes, in addition to the above-referenced downforce body 114 and control system 102, one or more downforce elements 101, a chassis 112, four wheels 116, an electronic control system (ECS) 118, a powertrain 129, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. As depicted in FIG. 1, each wheel 116 comprises a wheel assembly that includes a tire 117 as well as a wheel and related components (and that are collectively referred to as the "wheel 116" at times for the purposes of this Application). In various embodiments the vehicle 100 may differ from that depicted in FIG. 1.

In the exemplary embodiment illustrated in FIG. 1, the powertrain 129 includes an actuator assembly 120 that includes an engine 130. In various other embodiments, the powertrain 129 may vary from that depicted in FIG. 1 and/or described below (e.g. in some embodiments the powertrain may include a gas combustion engine 130, while in other embodiments the powertrain 129 may include an electric motor, alone or in combination with one or more other powertrain 129 components, for example for electric vehicles, hybrid vehicles, and the like). In one embodiment depicted in FIG. 1, the actuator assembly 120 and the powertrain 129 are mounted on the chassis 112 that drives the wheels 116. In one embodiment, the engine 130 comprises a combustion engine. In various other embodiments, the engine 130 may comprise an electric motor and/or one or more other transmission system components (e.g. for an electric vehicle), instead of or in addition to the combustion engine.

Still referring to FIG. 1, in one embodiment, the engine 130 is coupled to at least some of the wheels 116 through one or more drive shafts 134 (or axles). In the depicted embodiment, front axles 135 and rear axles 136 are depicted. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In various embodiments, the steering system 150 includes a steering wheel and a steering column, not depicted in FIG. 1.

The braking system 160 is mounted on the chassis 112, and provides braking for the vehicle 100. As depicted in FIG. 1, the braking system 160 includes one or more braking units 161. In the depicted example, the braking units 161 include one or more front braking units 162 (e.g. that provide braking via one or more front wheels 116) along with one or more rear braking units 163 (e.g. that provide braking via one or more rear wheels 116). In various embodiments, the braking units 161 may include one or more various types of braking units, for example such as friction braking units, regenerative braking units, hydraulic braking units, and/or one or more other different types of braking units. In various embodiments, the vehicle 100 automatically controls braking of the vehicle 100 via the braking units 161, at least in certain circumstances, via instructions provided from the control system 102 to the braking system 160.

With regard to the above-referenced downforce elements 101, in various embodiments the downforce elements 101 may comprise one or more wings, airfoils, spoilers, vents, and/or other devices that are configured to increase or decrease airflow based on control by the control system 102. In certain embodiments, the downforce elements 101 are mechanically operated and/or adjusted via the control system 102, for example by moving the downforce elements 101 into a different position, angle, or pitch, and/or by opening or closing a vent or other feature of the downforce elements 101. As depicted in FIG. 1, in various embodiments the downforce elements 101 may be formed from, within, against, or inside the body 114 of the vehicle 100 at any number of locations of the vehicle 100, for example in the front of the vehicle 100, in the back of the vehicle 100 (e.g. one or more front airfoils 151), in the rear of the vehicle 100 (e.g. one or more rear spoilers 152), on one or more sides of the vehicle 100 (e.g. one or more sets of wings 153), and/or within or underneath the body 114 (e.g. one or more vents 154 underneath the vehicle 100). It will be appreciated that the number, type, and/or location of the downforce elements 101 may vary in different embodiments. For example, in certain embodiments, the vehicle 100 may include a single downforce element 101. In other embodiments, the vehicle 100 may include multiple downforce elements 101, such as certain of the downforce elements 101 depicted in FIG. 1 and/or other downforce elements 101.

As noted above, the control system 102 controls lift of the vehicle 100. In various embodiments, the control system 102 obtains measurements for various parameter values pertaining to the vehicle 100 during operation of the vehicle 100, determines whether lift of the body 114 of the vehicle 100 is likely based on the parameter values, and implements one or more control measures (such as applying one or more of the braking units 161, applying a torque change via the powertrain, for example via the engine 130, and/or adjusting a downforce for the vehicle 100 utilizing one or more of the downforce elements 101) when it is determined that vehicle lift is likely for the vehicle 100, for example as discussed further below in greater detail in connection with the process 200 of FIGS. 2 and 3. In one embodiment, the control system 102 is mounted on the chassis 112.

As depicted in FIG. 1, in one embodiment the control system 102 comprises various sensors 104 (also referred to herein as a sensor array) and a controller 106. The sensors 104 include various sensors that provide measurements for use in controlling lift for the vehicle 100. In the depicted embodiment, the sensors 104 include one or more force sensors 164, wheel speed sensors 165, accelerometers 166, height sensors 168, and pitch sensors 170.

The force sensors 164 measure a load on one or more of the tires 117 and/or a downforce on one or more of the tires 117, wheels 116, and/or axles 135, 136. In various embodiments, force sensors 164 are disposed on, against, or proximate each of the axles 135, 136. In addition, in certain embodiments, force sensors 164 are disposed on, against, or proximate each of the tires 117 and/or wheels 116. In addition, in certain embodiments, other force sensors 164 measure a y-axis moment for the vehicle 100. Also in various embodiments, measurements from the force sensors 164 are provided to the controller 106 for processing, and for controlling lift for the vehicle 100.

The wheel speed sensors 165 measure one or more speeds or related values pertaining to one or more of the wheels 116. In various embodiments, wheel speed sensors 165 are disposed on, against, or proximate each of the wheels 116. Also in various embodiments, measurements from the wheel speed sensors 165 include measurements of, and/or are used to determine, wheel slip and spin for the various wheels 116. The measurements and values from the wheel speed sensors 165 are provided to the controller 106 for processing, and for controlling lift for the vehicle 100.

The accelerometers 166 measure a one or more acceleration values for the vehicle 100. In one embodiment, the accelerometers 166 are used to measure a longitudinal acceleration for the vehicle 100. In various embodiments, accelerometers 166 are disposed within the body 114 of the vehicle 100. Also in various embodiments, measurements from the accelerometers 166 are provided to the controller 106 for processing, and for controlling lift for the vehicle 100.

The height sensors 168 measure a ride height of the vehicle 10. In various embodiments, one or more height sensors 168 are disposed within or proximate one or more of the wheels 116 and/or the chassis 112. In certain embodiments, the height sensors 168 comprise chassis position sensors. Also in various embodiments, measurements from the height sensors 168 are provided to the controller 106 for processing, and for controlling lift for the vehicle 100.

The pitch sensors 170 measure one or more pitches pertaining to the vehicle. In certain embodiments, the pitch sensors 170 may comprise one or more of the height sensors 168, and the vehicle pitch may be determined based on a front/rear ride height of the vehicle 100. In other embodiments, separate pitch sensors 170 (e.g., that may be similar to yaw sensors) may be utilized. Also in various embodiments, measurements from the pitch sensors 170 are provided to the controller 106 for processing, and for controlling lift for the vehicle 100.

The controller 106 is coupled to the sensors 104 and to one or more other vehicle components (e.g. the downforce elements 101, the electronic control system (ECS) 118, the powertrain 129, e.g. the engine 130, the braking system 160, among other possible vehicle components) for controlling lift for the vehicle 100. In various embodiments, the controller 106 performs these and other functions in accordance with the processes described further below in connection with FIGS. 2 and 3.

As depicted in FIG. 1, the controller 106 comprises a computer system. In certain embodiments, the controller 106 may also include one or more of the sensors of the sensors 104, one or more other devices and/or systems, and/or components thereof. In addition, it will be appreciated that the controller 106 may otherwise differ from the embodiment depicted in FIG. 1. For example, the controller 106 may be coupled to or may otherwise utilize one or more remote computer systems and/or other systems, such as the braking system 160, the electronic control system (ECS) 118 of the vehicle 100, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs contained within the memory 174 and, as such, controls the general operation of the controller 106 and the computer system of the controller 106, generally in executing the processes described herein, such as those described further below in connection with FIG. 2.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184 (e.g. threshold values used for controlling lift in the vehicle 100).

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensors 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps described further below in connection with FIG. 2. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other systems.

It will be appreciated that the vehicle 100 can be operated in an automated manner by commands, instructions, and/or inputs that are "self-generated" onboard the vehicle itself. Alternatively or additionally, the vehicle 100 can be controlled by commands, instructions, and/or inputs that are generated by one or more components or systems external to the vehicle 100, including, without limitation: other vehicles; a backend server system; a control device or system located in the operating environment; or the like. In certain embodiments, therefore, the vehicle 100 can be controlled using vehicle-to-vehicle data communication, vehicle-to-infrastructure data communication, and/or infrastructure-to-vehicle communication, among other variations (including partial or complete control by the driver or other operator in certain modes, for example as discussed above).

Figure 2:
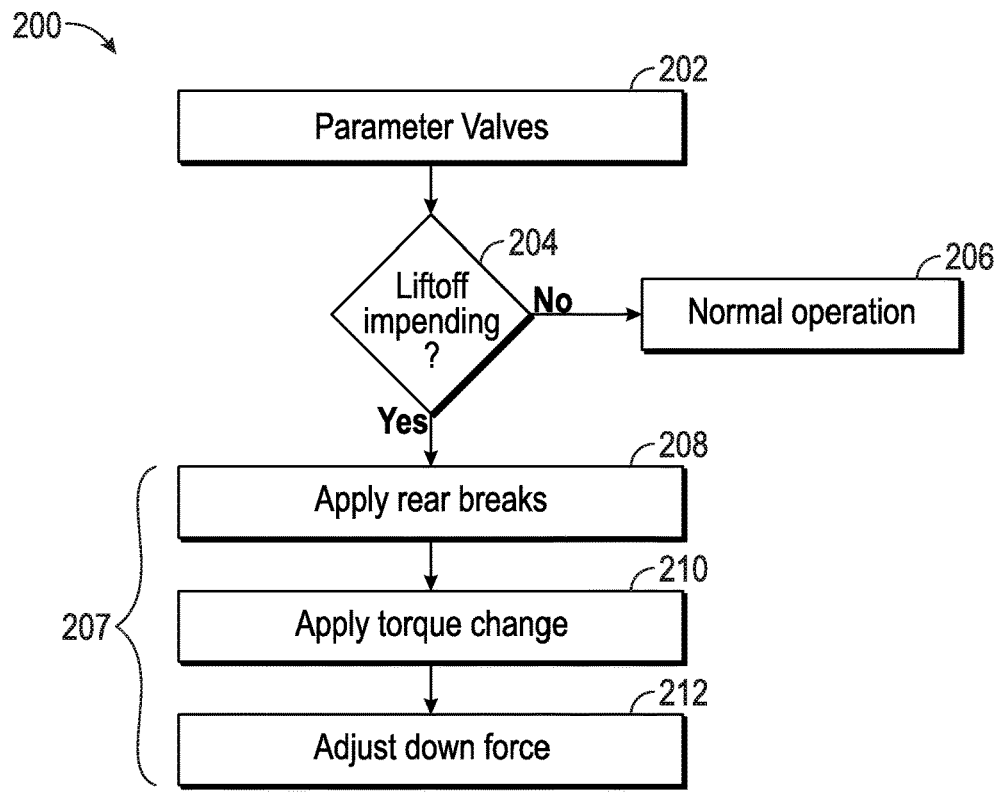
FIG. 2 is a flowchart of a process for controlling lift for a vehicle, and that can be used in connection with the system and vehicle of FIG. 1, in accordance with an exemplary embodiment.

With reference to FIG. 2, a flowchart is provided for a process 200 for controlling lift in a vehicle, in accordance with an exemplary embodiment. The process 200 may be implemented in connection with the vehicle 100 of FIG. 1, including the downforce elements 101 and the control system 102 thereof, in accordance with various embodiments.

As depicted in FIG. 2, the process 200 begins at step 202. In one embodiment, the process 200 begins when a vehicle is in operation, for example, when the vehicle is in a "drive mode", moving along a path or roadway, and/or ready for movement along a desired path.

During step 202, various data is obtained pertaining to parameters for the vehicle. In various embodiments, the data includes various information, measurements, and other data from the sensors 104 of FIG. 1 pertaining to parameters pertaining to the vehicle 100, the operation thereof, and/or the roadway or path on which the vehicle 100 is travelling.

In one embodiment, the data of step 204 includes the load the tires 117 (e.g. as measured via the force sensors 164) (preferably including the loads on the front and the rear tires), a y-axis moment for the vehicle 100 (preferably measured via one or more force sensors 164), wheel slip and wheel spin values for the wheels 116 (e.g. as measured via the wheel speed sensors 165), a longitudinal acceleration for the vehicle 100 (e.g. as measured via the accelerometers 166), a ride height and ride height gradient for the vehicle 100 (e.g. as measured via one or more of the height sensors 168, such as via one or more chassis position sensors), and a pitch of the vehicle (e.g. as measured via the pitch sensors 170). In addition, in certain embodiments, data is also obtained regarding one or more vehicle faults pertaining to vehicle dynamics, for example as determined via the steering system 150, the braking system 160, the ECS 118, the control system 102, and/or one or more other vehicle systems (e.g., as communicated via the vehicle bus 107 and/or the wireless system 108 from such other systems to the control system 102).

A determination is made as to whether a lift of the vehicle 100 is impending (step 204). In various embodiments, this determination is made via the processor 172 of FIG. 1 based on the parameter values of step 202. In one embodiment, such parameter values are utilized to determine whether a portion of the vehicle 100 is likely to increase in height above the roadway or path on which the vehicle 100 is travelling by an amount that exceeds a predetermined threshold. In one embodiment, the determination pertains to an increase in height of a front portion of the vehicle with respect to the ground; however, this may vary in other embodiments. In one embodiment, embodiment, the determination pertains to a distance between an underbody of the vehicle to the ground. In certain embodiments, the distance is measured at the source, for example via one or more magnetoresistive (MR) damper position sensors, and/or one or more wheel sensors (e.g. measuring wheel heights), and/or via one or more chassis position sensors. In various embodiments, a pre-determined threshold may comprise a ride height (or a frame to ground relationship) displacement that has been pre-determined at which anything more would result in the tires becoming un-steerable due to either physically lifting off the ground or being in very close proximity to doing so.

In one embodiment, the determination in step 204 comprises a determination as to when front wheel lift for the vehicle is inevitable. In certain embodiments, this situation is recognized via chassis position sensors, wheel speed sensors, IMU (inertial measurement unit) signals, or a combination of these. Also in one embodiment, once the pre-determined threshold is reached, action is then taken so as to mitigate this situation if possible. Also, in certain embodiments, a rate of change of ride height acceleration could also be used as a parameter in determining a possible lift-off situation (e.g. if the rate of change of ride height acceleration exceeds a predetermined threshold).

If it is determined in step 206 that a lift of the vehicle is not impending, then no changes are made, and the vehicle 100 continues operation as normal (step 206). In certain embodiments, downforce may continue to be applied as normal, but is not adjusted based on any impending lift.

Conversely, if it is determined in step 204 that a lift of the vehicle is impending, then one or more corrective actions are implemented in steps 208, 210, and/or 212. Steps 208, 210, and 212 are also collectively referred to as combined step 207 in FIG. 2, representing one or more corrective actions for when a lift of the vehicle is determined to be impending. Specifically, as set forth in greater detail below, in various embodiments the vehicle lift is prevented or remedied by applying one or more braking units, applying or removing torque to (or from) the powertrain, and/or adjusting a downforce for the vehicle. In certain embodiments, one of these techniques may be utilized. In other embodiments, two of these techniques may be utilized. In yet other embodiments, each of these techniques may be utilized.

In various embodiments, when an impending vehicle lift is detected, the engine torque could be reduced, the rear brakes could be applied, and the active aero elements could be adjusted. Also in certain embodiments, if the additional actions can also be taken with the active aero elements during this timeframe that may cause the driver to maintain control and land the vehicle safely at a favorable angle relative to the ground. For example, in one embodiment, if a determination is made that front ride height is accelerating upward greater than a predetermined threshold, then first steps may include relatively slower steps such as ramping in more front downforce and/or trimming rear (assuming we are in a vehicle dynamics state that allows such actions). In one embodiment, an axle torque may then be reduced. In addition, in one embodiment, once a hard calibratable height value has been exceeded, then brake torque is sharply applied to the rear axle for a relatively short amount of time (e.g. for a split second, in one embodiment) to try to force the front end of the vehicle down.

As alluded to above, in one embodiment, one or more braking units of the vehicle are applied when a vehicle lift is determined to be impending (step 208). In various embodiments, braking units 161 of the braking system 160 of FIG. 1 are applied via instructions provided by the processor 172 of FIG. 1 when a vehicle lift is determined to be impending. In various embodiments, the rear braking units 163 are applied. In certain embodiments, the front braking units 162 may be applied, instead of or in addition to the rear braking units 163. In various embodiments, torque applied to the braking units in step 208 causes the portion of the vehicle 100 that is experiencing lift (or that is about to experience lift) (e.g. the front region of the vehicle 100, near the hood) to move back to ground and/or remain on the ground.

In addition, in one embodiment, torque is applied via the powertrain when a vehicle lift is determined to be impending (step 210). In various embodiments, the torque is applied to the engine 130 and/or to one or more other components of the powertrain 129 of FIG. 1 via instructions provided by the processor 172 of FIG. 1 when a vehicle lift is determined to be impending. In various embodiments, the torque applied to the powertrain during step 210 causes the portion of the vehicle 100 that is experiencing lift (or that is about to experience lift) (e.g. the front region of the vehicle 100, near the hood) to move back to ground and/or remain on the ground.

In addition, in one embodiment, an adjusted downforce of the vehicle is provided when a vehicle lift is determined to be impending (step 212). In various embodiments, the adjustment of the downforce is made by one or more of the downforce elements 101 of FIG. 1 via instructions provided by the processor 172 of FIG. 1 when a vehicle lift is determined to be impending. In various embodiments, a relative downforce (front versus rear) is adjusted in step 212 to prevent or stop the vehicle lift. For example, in one embodiment, if the front portion of the vehicle 100 is experiencing lift or is about to experience lift, then a relative downforce of the front of the vehicle is increased relative to the downforce of the rear of the vehicle. Likewise, in one embodiment, if the rear portion of the vehicle 100 is experiencing lift or is about to experience lift, then a relative downforce of the rear of the vehicle is increased relative to the downforce of the front of the vehicle. The adjusted downforce causes the portion of the vehicle 100 that is experiencing lift (or that is about to experience lift) (e.g. the front region of the vehicle 100, near the hood) to move back to ground and/or remain on the ground.

Figure 3:
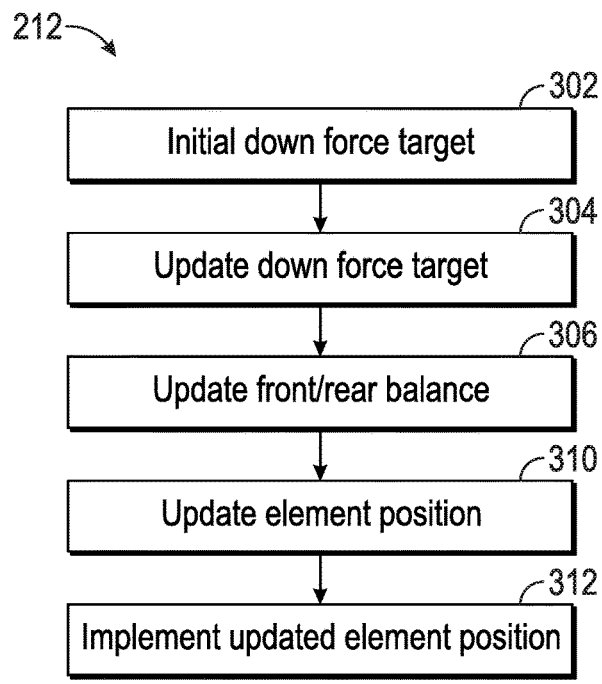
FIG. 3 is a flowchart of a sub-process for the process of FIG. 2, namely for providing an adjusted downforce for the vehicle, in accordance with an exemplary embodiment.

With reference to FIG. 3, a flowchart is provided with respect to various steps (or sub-steps) for step 212 (or sub-process 212) of FIG. 2 for providing an adjusted downforce for the vehicle, in accordance with an exemplary embodiment.

As depicted in FIG. 3, in one embodiment, initial downforce targets are obtained (step 302). In one embodiment, the initial downforce targets comprise a standard or default value of downforce for the vehicle. In various embodiments, different downforce targets are obtained for the front of the vehicle versus for the rear of the vehicle. Also in one embodiment, the initial downforce targets are stored in the memory 174 of FIG. 1 as stored values 184 thereof prior to the current ignition cycle or vehicle drive (e.g. during manufacturing, or during configuration for racing or other performance features, among other possible configurations). Also in one embodiment, the initial downforce targets comprise default values under average, normal, or typical conditions, and/or in the absence of other parameter data. Similar to the discussion above, in certain embodiments, separate initial downforce targets are obtained for the front versus rear axles 135, 136. In certain embodiments, the initial downforce targets include separate initial maximum downforce target values for the front and rear axles 135, 136.

In addition, one or more updated downforce targets are determined (step 304). In one embodiment, during step 304, the downforce target is updated upward or downward from the initial target of step 302, based on the combination of the effects of the various parameter values of step 202, and based on whether an imminent lift of the vehicle is determined in step 204. For example, in one embodiment, the downforce target is adjusted upward for the portion of the vehicle that is experiencing lift or that is about to experience lift, and/or a relative downforce is adjusted upward for the portion of the vehicle that is experiencing lift or about to experience lift (versus the opposite portion of the vehicle, i.e. front or rear). It will also be appreciated that the downforce targets may also be updated based on various other parameters as well.

A front and rear balance of the vehicle is adjusted (step 306). In one embodiment, a balance between the front and rear of the vehicle 100 is adjusted by the processor 172 of FIG. 1 based on the updated downforce targets of step 304. Specifically, in one embodiment, the change in the downforce target is effectively distributed between the front and rear axles 135, 136 of the vehicle 100 in order to help prevent, alleviate, or stop any vehicle lift. In one such embodiment, the change in the downforce target is effectively distributed equally between the front and rear axles 135, 136, but the relative downforce is changed when an impending lift of the vehicle is determined (e.g. by increasing the relative downforce for the portion of the vehicle for which vehicle lift is impending, to thereby prevent, alleviate, or stop the vehicle lift).

A desired position or adjustment of one or more downforce elements is determined (step 310). In various embodiments, the processor 172 of FIG. 1 determines a desired position or adjustment of one or more of the downforce elements 101 of FIG. 1 (for example, one or more front airfoils 151, rear spoilers 152, wings 153, and/or vents 154) in order to attain desired downforce adjustments for the vehicle 100 (e.g. for the front axle 135, the rear axle 136, or both) to attain the desired updated downforce target and front/rear balance of steps 304 and 306. In various embodiments, the desired position or adjustment may pertain to a change in position, an end position, or both, of the respective downforce elements (101) (e.g. a change in angle, amount of opening, physical location, and so on), and/or a particular action (e.g. by an actuator, valve, or other device) that may be controlled by the processor 172 for obtaining this desired result.

The desired position or adjustment of the one or more downforce elements is then implemented (step 312). In various embodiments, the processor 172 of FIG. 1 causes a change in angle, movement, opening or closure, or other change in angle, position, or status of the respective downforce elements 101 in order to achieve the desired position or adjustment of step 310. In various embodiments, the controller 106 controls one or more actuators, vents, and/or other control mechanisms for adjustment of the respective downforce elements 101 in this manner (e.g. by adjusting an angle or position of one or more front airfoils 151, rear spoilers 152, and/or wings 153, and/or opening or closing one or more vents 154, among other potential actions in accordance with various embodiments).

Accordingly, methods, systems, and vehicles are provided that control vehicle lift, such as for racecars or other performance vehicles. In various embodiments, the vehicle lift is controlled by applying braking units of the vehicle, providing torque to a powertrain of the vehicle, and/or providing an adjusted downforce for the vehicle. Such methods, systems, and vehicles can be advantageous, for example, by keeping the vehicle in proximity to the ground of the roadway or path on which the vehicle is travelling.

It will be appreciated that the disclosed methods, systems, and vehicles may vary from those depicted in the Figures and described herein. For example, the vehicle 100, the downforce elements 101, the control system 102, the propulsion system 129, the braking system 160, and/or various components thereof may vary from that depicted in FIG. 1 and described in connection therewith. It will similarly be appreciated that the process 200 may differ from that depicted in FIGS. 2 and 3, and/or that one or more steps may occur simultaneously or in a different order than depicted in FIG. 2, among other possible variations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:
1. A method comprising:
obtaining one or more parameter values for a vehicle during operation of the vehicle, the vehicle having a plurality of front wheels, a plurality of rear wheels, a front axle coupled to the plurality of front wheels, and a rear axle coupled to the plurality of rear wheels;

determining, using the one or more parameter values, a ride height and an acceleration of ride height for the vehicle; and applying, via instructions provided via a processor:
a ramped up front downforce, a ramped down rear downforce, or both, when the acceleration of the ride height is greater than a first predetermined threshold; and
braking torque to the rear axle of the vehicle for a non-zero amount of time that is less than one second when the ride height is greater than a second predetermined threshold.

2. The method of claim 1 further comprising:
applying a torque change via a driveline of the vehicle when it is determined that the unplanned lift of the vehicle is likely.

3. The method of claim 1, wherein the ramped up front downforce is provided, via instructions provided by the processor, when the acceleration of the ride height is greater than the first predetermined threshold.

4. The method of claim 1, wherein the ramped up rear downforce is provided, via instructions provided by the processor, when the acceleration of the ride height is greater than the first predetermined threshold.

5. The method of claim 1, wherein the ramped up front downforce and the ramped up rear downforce are both provided, via instructions provided by the processor, when the acceleration of the ride height is greater than the first predetermined threshold.

6. The method of claim 1, wherein an axle torque is reduced, via instructions provided by the processor, when the acceleration of the ride height is greater than the first predetermined threshold.

7. The method of claim 1, wherein braking is applied:
to a rear axle of the vehicle when lift is detected for a front portion of the vehicle; and
to a front axle of the vehicle when lift is detected for a rear portion of the vehicle.

8. A system comprising:
one or more sensors configured to measure values pertaining to one or more parameter values for a vehicle during operation of the vehicle, the vehicle having a plurality of front wheels, a plurality of rear wheels, a front axle coupled to the plurality of front wheels, and a rear axle coupled to the plurality of rear wheels; and
a processor coupled to the one or more sensors and configured to:
determine, using the one or more parameter values, a ride height and an acceleration of ride height for the vehicle; and
provide instructions to provide:
a ramped up front downforce, a ramped down rear downforce, or both, when the acceleration of the ride height is greater than a first predetermined threshold; and
braking torque to the rear axle of the vehicle for a non-zero amount of time that is less than one second when the ride height is greater than a second predetermined threshold.

9. The system of claim 8, wherein the processor is further configured to:
apply a torque change via a driveline of the vehicle when it is determined that the unplanned lift of the vehicle is likely.

10. The system of claim 8, wherein the ramped up front downforce is provided, via instructions provided by the processor, when the acceleration of the ride height is greater than the first predetermined threshold.

11. The system of claim 8, wherein the ramped up rear downforce is provided, via instructions provided by the processor, when the acceleration of the ride height is greater than the first predetermined threshold.

12. The system of claim 8, wherein the ramped up front downforce and the ramped up rear downforce are both provided, via instructions provided by the processor, when the acceleration of the ride height is greater than the first predetermined threshold.

13. The system of claim 8, wherein an axle torque is reduced, via instructions provided by the processor, when the acceleration of the ride height is greater than the first predetermined threshold.

14. The system of claim 8, wherein braking is applied:
to a rear axle of the vehicle when lift is detected for a front portion of the vehicle; and
to a front axle of the vehicle when lift is detected for a rear portion of the vehicle.

15. A vehicle comprising:
a body;
a plurality of front wheels;
a plurality of rear wheels;
a front axle coupled to the plurality of front wheels, and a rear axle coupled to the plurality of rear wheels;
one or more sensors configured to measure values pertaining to one or more parameter values for a vehicle during operation of the vehicle; and
a processor coupled to the one or more sensors and configured to:
determine, using the one or more parameter values, a ride height and an acceleration of ride height for the vehicle; and
provide instructions to apply:
a ramped up front downforce, a ramped down rear downforce, or both, when the acceleration of the ride height is greater than a first predetermined threshold; and
braking torque to the rear axle of the vehicle for a non-zero amount of time that is less than one second when the ride height is greater than a second predetermined threshold.

16. The vehicle of claim 15, wherein the ramped up front downforce is provided, via instructions provided by the processor, when the acceleration of the ride height is greater than the first predetermined threshold.

17. The vehicle of claim 15, wherein the ramped up rear downforce is provided, via instructions provided by the processor, when the acceleration of the ride height is greater than the first predetermined threshold.

18. The vehicle of claim 15, wherein the ramped up front downforce and the ramped up rear downforce are both provided, via instructions provided by the processor, when the acceleration of the ride height is greater than the first predetermined threshold.

19. The vehicle of claim 15, wherein an axle torque is reduced, via instructions provided by the processor, when the acceleration of the ride height is greater than the first predetermined threshold.

20. The vehicle of claim 15, wherein braking is applied:
to a rear axle of the vehicle when lift is detected for a front portion of the vehicle; and
to a front axle of the vehicle when lift is detected for a rear portion of the vehicle.

* * * * *